(12) United States Patent
Berstis

(10) Patent No.: US 6,271,830 B1
(45) Date of Patent: Aug. 7, 2001

(54) THREE- POINT CAPACITOR TRACKPOINT

(75) Inventor: Viktors Berstis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/159,960

(22) Filed: Sep. 24, 1998

(51) Int. Cl.$^7$ ............................................. G09G 5/08
(52) U.S. Cl. ......................... 345/157; 345/160; 345/174; 341/33
(58) Field of Search ............................ 345/157–161, 345/163, 167, 173; 341/33, 20; 200/6 A (56) References Cited

U.S. PATENT DOCUMENTS

| | | | |
|---|---|---|---|
| 4,736,191 | * | 4/1988 | Matzke et al. ........................ 345/161 |
| 5,555,004 | * | 9/1996 | Ono et al. ............................. 345/161 |
| 5,657,012 | * | 8/1997 | Tait ....................................... 341/33 |
| 5,796,355 | * | 8/1998 | Smigeski . | |
| 5,854,625 | * | 12/1998 | Frisch et al. ......................... 345/173 |
| 5,949,354 | * | 9/1999 | Chang ................................... 341/33 |
| 5,973,668 | * | 10/1999 | Watnnabe ............................. 345/161 |
| 6,115,030 | * | 9/2000 | Berstis et al. ........................ 345/161 |

* cited by examiner

Primary Examiner—Regina Liang
(74) Attorney, Agent, or Firm—Jeffrey S. LaBaw; Bracewell & Patterson, L.L.P.

(57) ABSTRACT

A capacitive trackpoint device employs three capacitive sensors rather than four to increase sensitivity while reducing power consumption. Use of capacitive rather than resistive sensors provides a more sensitive and consistent signal with respect to pressure and a greater dynamic range than can be obtained from a resistive or strain gauge sensor, while use of larger area capacitive sensors for a given total area reduces the power requirements for reading the sensors both by having fewer capacitive sensors to read and by reducing the oscillating frequency. Because a more sensitive sensor is utilized, sampling of the signal may be made for a shorter time during periods of inactivity. The overall reduction in power consumption is particularly important for battery operated, hand-held input devices. Use of three sensors rather than four allows sampling of only two in a power-saving mode during periods of inactivity. Normalized force signals measured from the sensing electrodes are translated into displacement-type signals in at least two independent directions through simple trigonometric computations, with the normalized, translated signals being transformed to conventional displacement signals for a pointing device. The reduced power consumption is especially significant for infrared remote control devices of the type employed to control a set-top box, in which battery life is an important consideration.

11 Claims, 7 Drawing Sheets

THREE-POINT CAPACITOR TRACKPOINT

BACKGROUND OF THE INVENTION

1. Technical Field

The present invention relates in general to pointing devices for data processing systems and in particular to trackpoint-type pointing devices. Still more particularly, the present invention relates to construction and operation of a capacitive trackpoint-type pointing device for use with data processing systems.

2. Description of the Related Art

Data processing systems with operating systems or applications employing a graphical user interface (GUI) typically include a pointing device such as a mouse, trackball, or touch pad. Using a pointing device, a user directs movement of a pointer icon (or "cursor," any graphical object utilized to point to a particular location in a display including, for example, a figure in a computer game) across the user interface by performing corresponding manual movements on the pointing device, for example by sliding the mouse, rolling the ball of the trackball, or moving across the surface of the touch pad. One or more buttons on the pointing device may be actuated to select items within the interface, such as icons representing applications or operating system controls.

One particular example of a pointing device employed in data processing systems is IBM Corporation's TrackPoint® pointing device, a trackpoint-type device similar to those frequently mounted in the keyboards of laptop or notebook data processing systems. A Trackpoint-type device includes a button-like structure (or "post") resembling a pencil eraser protruding from between the keys in a keyboard or from the surface of the structure incorporating the pointing device. The Trackpoint-type device eliminates the need for a flat working surface on which the user must manipulate a mouse.

A conventional implementation of a Trackpoint-type pointing device includes resistive strain gauge sensors and a post serving as a lever arm. The resistance of the strain gauges vary depending on the force applied by the use to the lever arm via the button-like structure. By manipulating the post, the user flexes the strain gauges. Small analog signals reflecting the resistance of the strain gauges are interpreted by on-board software and translated to emulate a displacement as an output. The displacement is typically calculated as a function of the duration for which the user flexes the strain gauges, and the cursor on the display is moved accordingly.

The strain gauges of a conventional Trackpoint-type pointing device must be individually trimmed during manufacture to match their outputs. The manufacturing and trimming of the strain gauges, combined with the small analog signal they produce, contribute to the cost of the sensor and the associated electronics. Additionally, the small full-scale magnitude of the resistive signal change is a burden for the data acquisition system which processes the strain gauge signals and translate flex into cursor movement signals.

One approach to overcoming the design and manufacturing issues associated with resistive Trackpoint-type pointing devices, described in the related applications, has been to employ capacitive sensors to measure manipulation of the post by a user. The capacitive type Trackpoint device is less expensive and easier to manufacture, provides a larger magnitude full-scale signal corresponding the user manipulations of the post, and provides an equally effective basis for translating user manipulation into equivalent displacement signals.

Both the resistive and capacitive Trackpoint-type devices typically employ "quadrature detection," in which four sensors are provided to measure forces applied normally in any lateral direction. Each sensor detects lateral movement of the post along an X or Y axis normal to the post. For capacitive Trackpoint-type devices, lateral force on the post translates to moving capacitive plates of a sensor closer together, altering the capacitance of a sensor. Axial force (Z axis) on the post, which also moves the sensor's capacitive plates closer together, may be compensated for by offsetting one sensor's change in capacitance by the change in capacitance of the opposite sensor.

In the capacitive Trackpoint-type device, which employs four capacitors to sense force in different directions, it would be desirable to use capacitors as large as possible. It would further be advantageous to have a capacitive Trackpoint-type device which utilizes as little power as possible.

SUMMARY OF THE INVENTION

It is therefore one object of the present invention to provide an improved pointing device for data processing systems.

It is another object of the present invention to provide an improved trackpoint-type pointing device for data processing systems.

It is yet another object of the present invention to improve the construction and operation of a capacitive trackpoint-type pointing device for use with data processing systems.

The foregoing objects are achieved as is now described. A capacitive trackpoint device employs three capacitive sensors rather than four to increase sensitivity while reducing power consumption. Use of capacitive rather than resistive sensors provides a more sensitive and consistent signal with respect to pressure and a greater dynamic range than can be obtained from a resistive or strain guage sensor, while use of larger area capacitive sensors for a given total area reduces the power requirements for reading the sensors both by having fewer capacitive sensors to read and by reducing the oscillating frequency. Because a more sensitive sensor is utilized, sampling of the signal may be made for a shorter time during periods of inactivity. The overall reduction in power consumption is particularly important for battery operated, hand-held input devices. Use of three sensors rather than four allows sampling of only two in a power-saving mode during periods of inactivity. Normalized force signals measured from the sensing electrodes are translated into displacement-type signals in at least two independent directions through simple trigonometric computations, with the normalized, translated signals being transformed to conventional displacement signals for a pointing device. The reduced power consumption is especially significant for infrared remote control devices of the type employed to control a set-top box, in which battery life is an important consideration.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figures 1A, 1D:
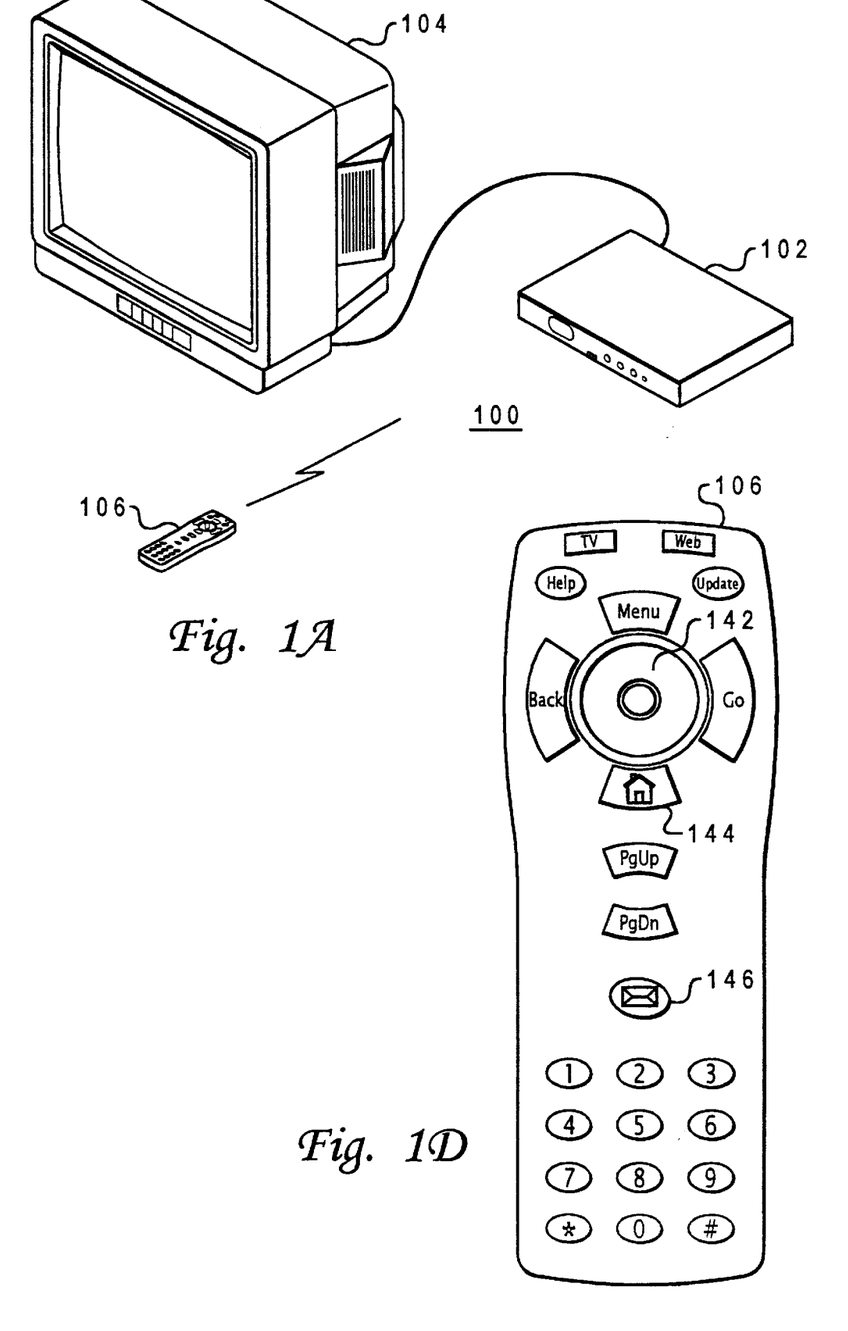
FIGS. 1A–1D depict various pictorial representations of a data processing system in which a preferred embodiment of the present invention may be implemented.

With reference now to the figures, and in particular with reference to FIGS. 1A through 1D, various pictorial representations of a data processing system in which a preferred embodiment of the present invention may be implemented are depicted. FIG. 1A is a pictorial representation of the data processing system as a whole. Data processing system 100 in the depicted example is a set-top type data processing system providing, with minimal economic costs for hardware to the user, access to the Internet. Data processing system 100 includes a data processing unit 102, which is preferably sized to fit in typical entertainment centers and provides all required functionality conventionally found in personal computers to enable a user to "browse" the Internet. Additionally, data processing unit 102 may provide other common functions such as, for example, serving as an answering machine, transmitting or receiving facsimile transmissions, or providing voice mail facilities.

Data processing unit 102 is connected to television 104 for display of graphical information. Television 104 may be any suitable television, although color televisions with an S-Video input will provide better presentations of the graphical information. Data processing unit 102 may be connected to television 104 through a standard coaxial cable connection. A remote control unit 106 allows a user to interact with and control data processing unit 102. Remote control unit 106 emits infrared (IR) signals, preferably modulated at a different frequency than the normal television, stereo, and VCR infrared remote control frequencies in order to avoid interference. Remote control unit 106 provides the functionality of a pointing device in conventional personal computers, including the ability to move a cursor on a display and select items.

Figure 1B:
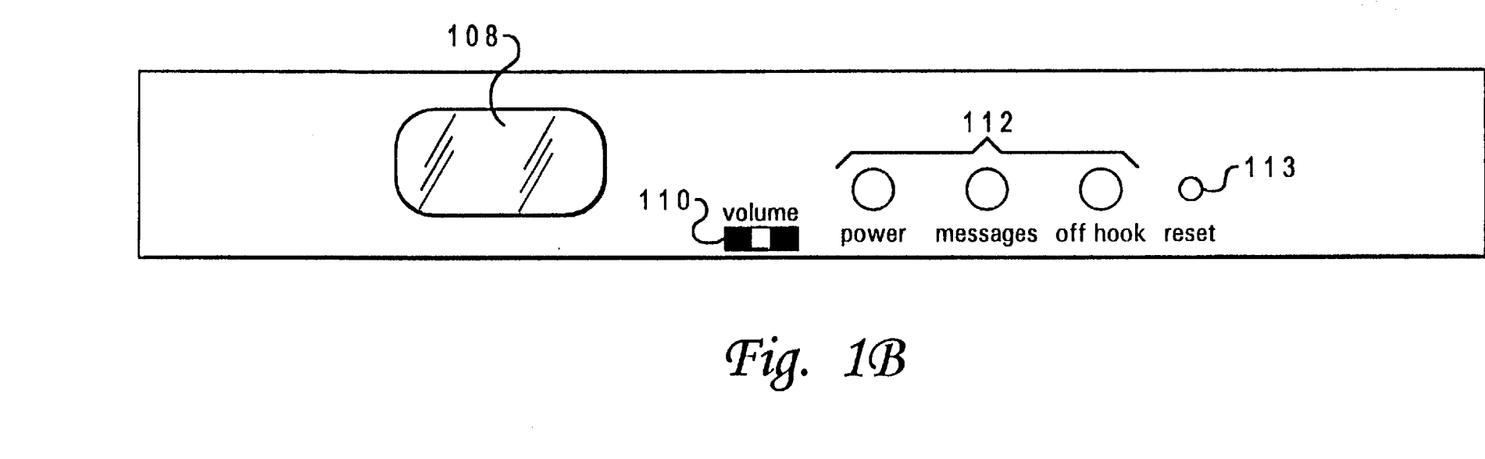

FIG. 1B is a pictorial representation of the front panel of data processing unit 102 in accordance with a preferred embodiment of the present invention. The front panel includes an infrared window 108 for receiving signals from remote control unit 106 and for transmitting infrared signals. Data processing unit 102 may transmit infrared signals to be reflected off objects or surfaces, allowing data processing unit 102 to automatically control television 104. Volume control 110 permits adjustment of the sound level emanating from a speaker within data processing unit 102. A plurality of light-emitting diode (LED) indicators 112 provide an indication to the user of when data processing unit 102 is on, whether the user has messages, whether the modem/phone line is in use, or whether data processing unit 102 requires service. System reset switch 113 is utilized only to recover from unusual system failures.

Figure 1C:
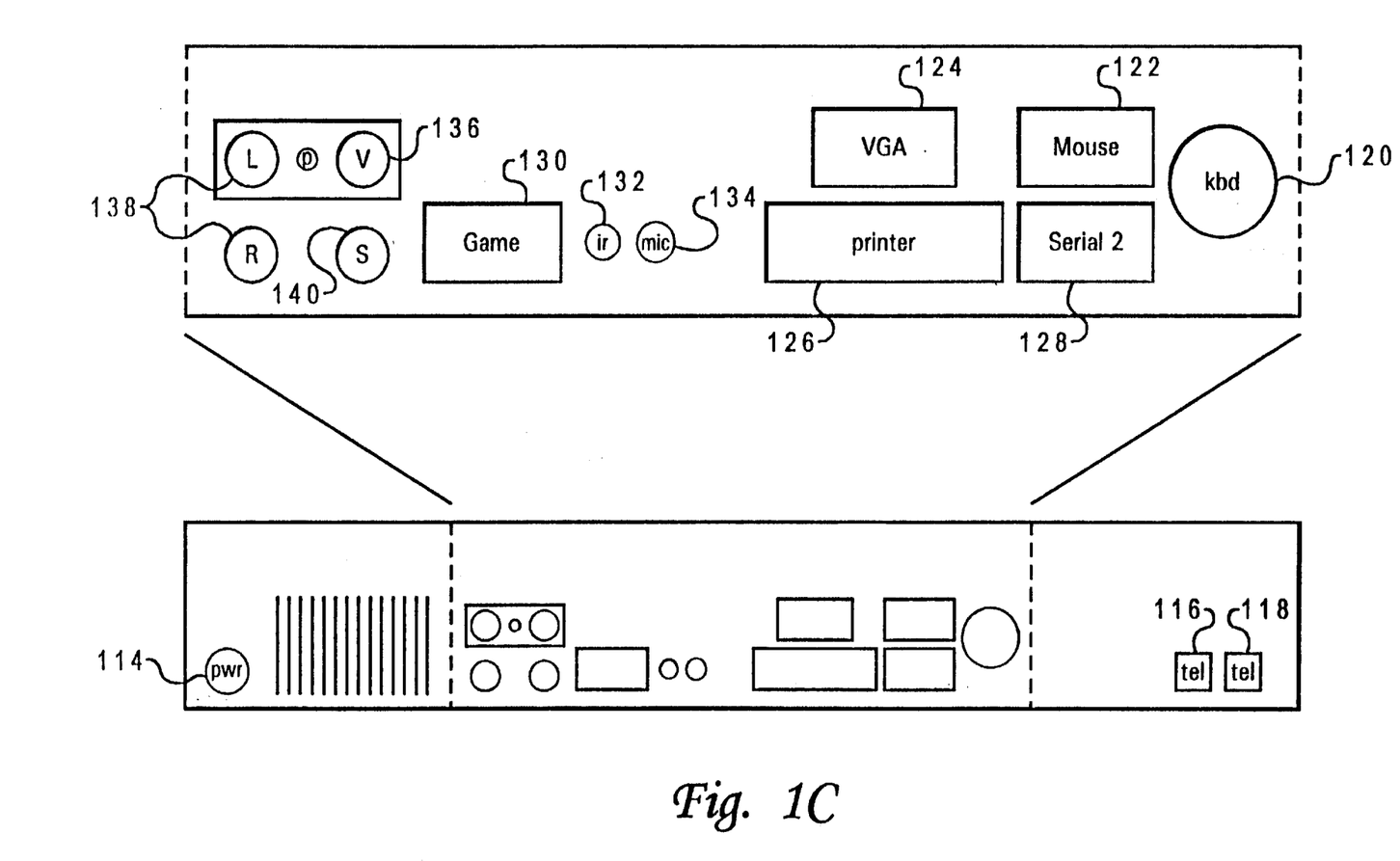

FIG. 1C is a pictorial representation of the rear panel of data processing unit 102 in accordance with a preferred embodiment of the present invention. A three wire (ground included) insulated power cord 114 passes through the rear panel. Standard telephone jacks 116 and 118 on the rear panel provide an input to a modem from the phone line and an output to a handset (not shown). The rear panel also provides a standard computer keyboard connection 120, mouse port 122, computer monitor port 124, printer port 126, and an additional serial port 128. These connections may be employed to allow data processing unit 102 to operate in the manner of a conventional personal computer. Game port 130 on the rear panel provides a connection for a joystick or other gaming control device (glove, etc.). Infrared extension jack 132 allows a cabled infrared LED to be utilized to transmit infrared signals. Microphone jack 134 allows an external microphone to be connected to data processing unit 102.

Video connection 136, a standard coaxial cable connector, connects to the video-in terminal of television 104 or a video cassette recorder (not shown). Left and right audio jacks 138 connect to the corresponding audio-in connectors on television 104 or to a stereo (not shown). If the user has S-Video input, then S-Video connection 140 may be used to connect to television 104 to provide a better picture than the composite signal. If television 104 has no video inputs, an external channel 3/4 modulator (not shown) may be connected in-line with the antenna connection.

FIG. 1D is a pictorial representation of remote control unit 106 in accordance with a preferred embodiment of the present invention. Similar to a standard telephone keypad, remote control unit 106 includes buttons for arabic numerals 0 through 9, the asterisk or "star" symbol (*), and the pound sign (#). Remote control unit also includes button "TV" for selectively viewing television broadcasts and button "Web" for initiating "browsing" of the Internet. A pointing device 142, which is preferably a trackpoint-type or "button" pointing device as described in further detail below, is included on remote control unit 106 and allows a user to manipulate a cursor on the display of television 104. Buttons "Go" and "Back," respectively, allow a user to select an option or return to a previous selection. Button "Menu" causes a context-sensitive menu of options to be displayed, while home button 144 allows to user to return to a default display of options. Buttons "PgUp" and "PgDn" buttons allow the user to change the content of the display in display-sized blocks rather than by scrolling. The message button 146 allows the user to retrieve messages. In addition to, or in lieu of, remote control unit 106, an infrared keyboard (not shown) with an integral pointing device may be used to control data processing unit 102. The integral pointing device is preferably a trackpoint-type or button type of pointing device as described in further detail below. A wired keyboard (also not shown) may also be used through keyboard connection 120, and a wired pointing device such as a mouse or trackball may be used through mouse port 122. When a user has one or more of the remote control unit 106, infrared keyboard, wired keyboard and/or wired pointing device operable, the active device locks out all others until a prescribed period of inactivity has passed.

Figure 2:
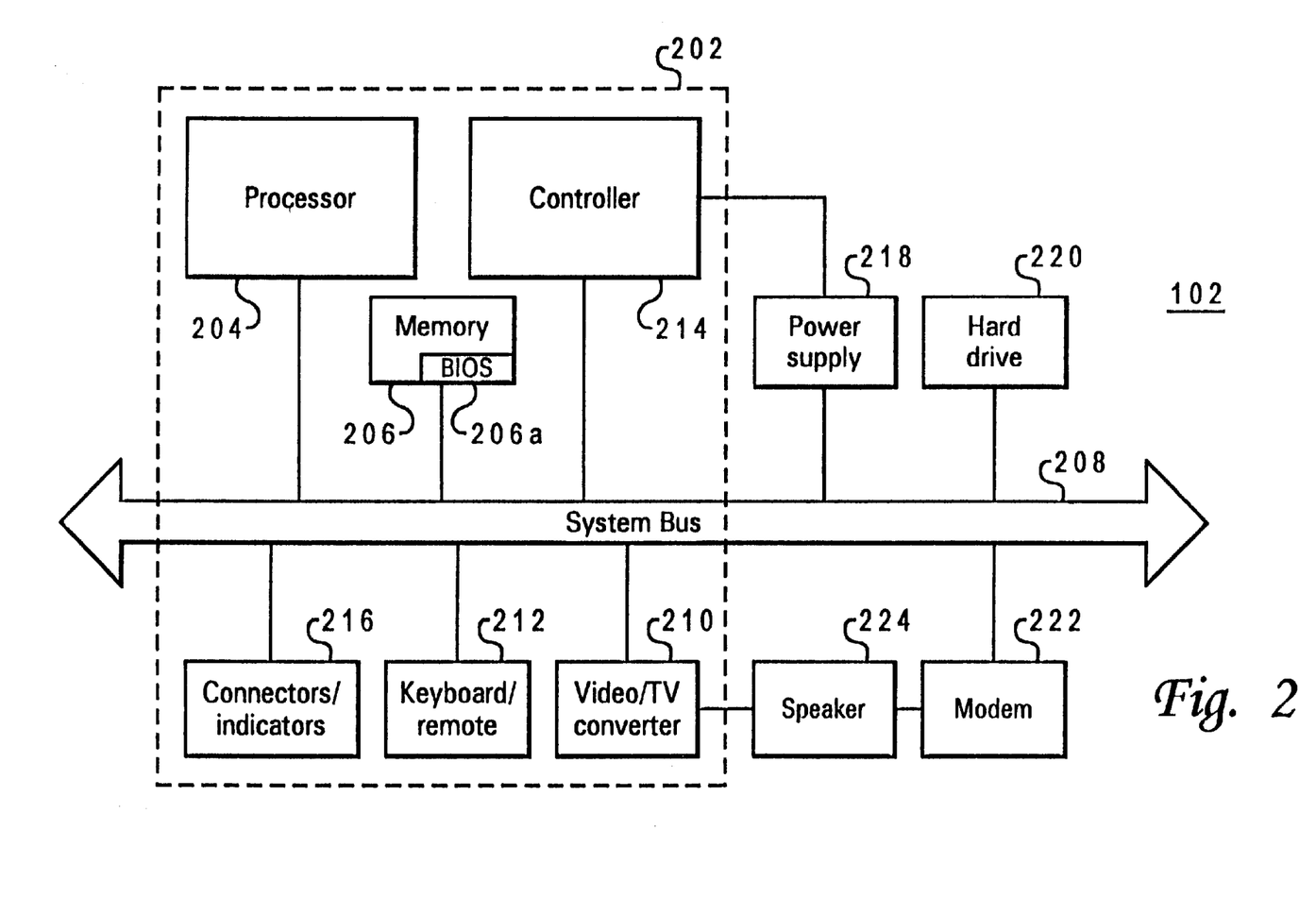
FIG. 2 is a block diagram for the major components of a data processing unit in accordance with a preferred embodiment of the present invention.

Referring now to FIG. 2, a block diagram for the major components of data processing unit 102 in accordance with a preferred embodiment of the present invention is portrayed. As with conventional personal computers, data processing unit 102 includes a motherboard 202 containing a processor 204 and memory 206 connected to system bus 208. Processor 205 is preferably at least a 486 processor operating at or above 100 MHz. Memory 206 includes read only memory (ROM) 206a containing a basic input/output services (BIOS) routine and may include cache memory and/or video RAM.

Video/TV converter 210 on motherboard 202 and connected to system bus 208 generates computer video signals for computer monitors, a composite television signal, and an S-Video signal. The functionality of video/TV converter 210 may be provided utilizing commercially available video and converter chips. Keyboard/remote control interface unit 212 on motherboard 202 receives keyboard codes through controller 214, regardless of whether a wired keyboard and/or pointing device or an infrared keyboard/remote control is being employed. Infrared remote control unit 106 transmits signals which are ultimately sent to the serial port as control signals generated by conventional mouse or pointing device movements. Two buttons on remote control unit 106 are interpreted identically to the two buttons on a conventional mouse, while the remainder of the buttons transmit signals corresponding to keystrokes on an infrared keyboard. Thus, remote control unit 106 has a subset of the functions provided by an infrared keyboard. Connectors and indicators 216 on motherboard 202 provide the connections and indicators on data processing unit 102 described above.

External to motherboard 202 in the depicted example are power supply 218, hard drive 220, modem 222, and speaker 224. Power supply 218 is a conventional power supply except that it receives a control signal from controller 214 which effects shut down of all power to motherboard 202, hard drive 220, and modem 222. In some recovery situations, removing power and rebooting is the only guaranteed method of resetting all of these devices to a known state. Thus, power supply 218, in response to a signal from controller 214, is capable of powering down and restarting data processing unit 102.

Hard drive 220 contains operating system and applications software for data processing unit 102, which preferably includes: IBM DOS 7.0, a product of International Business Machines Corporation in Armonk, N.Y.; Windows 3.1, a product Microsoft Corporation in Redmond, Wash. ; and Netscape Navigator, a product of Netscape Communications Corporation in Mountain View, Calif. Data may also be stored on hard drive 220. Modem 222, inserted into a slot mounted sideways on motherboard 202, is preferably a 33.6 kbps modem supporting the V.42bis, V34bis, V.34, V.17 Fax, MNP 1–5, and AT command set.

Controller 214 is preferably one or more of the 805× family controllers. Controller 214 is continuously powered and, when data processing unit 102 is turned on, monitors the system for a periodic "ping" indicating that data processing unit 102 is operating normally. In the event that controller 214 does not receive a ping within a prescribed timeout period, controller 214 removes power from the system and restarts the system. This may be necessary, for example, when the system experiences a general protection fault. If multiple attempts to restart the system prove unsuccessful, controller 214 shuts off data processing unit 102 and signals that service is required through indicators 216. Thus, data processing unit 102 is capable of self-recovery in some circumstances without involvement by a user.

Controller 214 also receives and processes input from infrared remote control 106, infrared keyboard, wired keyboard, or wired mouse. When one keyboard or pointing device is used, all others are locked out (ignored) until none have been active for a prescribed period. Then the first keyboard or pointing device to generate activity locks out all others. Controller 214 also directly controls all LED indicators except that indicating modem use and specifies the boot sector selection during any power off-on cycle.

Those skilled in the art will recognize that the components depicted in FIGS. 1A–1D and 2 and described above may be varied for specific applications or embodiments. Such variations in which the present invention may be implemented are considered to be within the spirit and scope of the present invention.

Figure 3A:
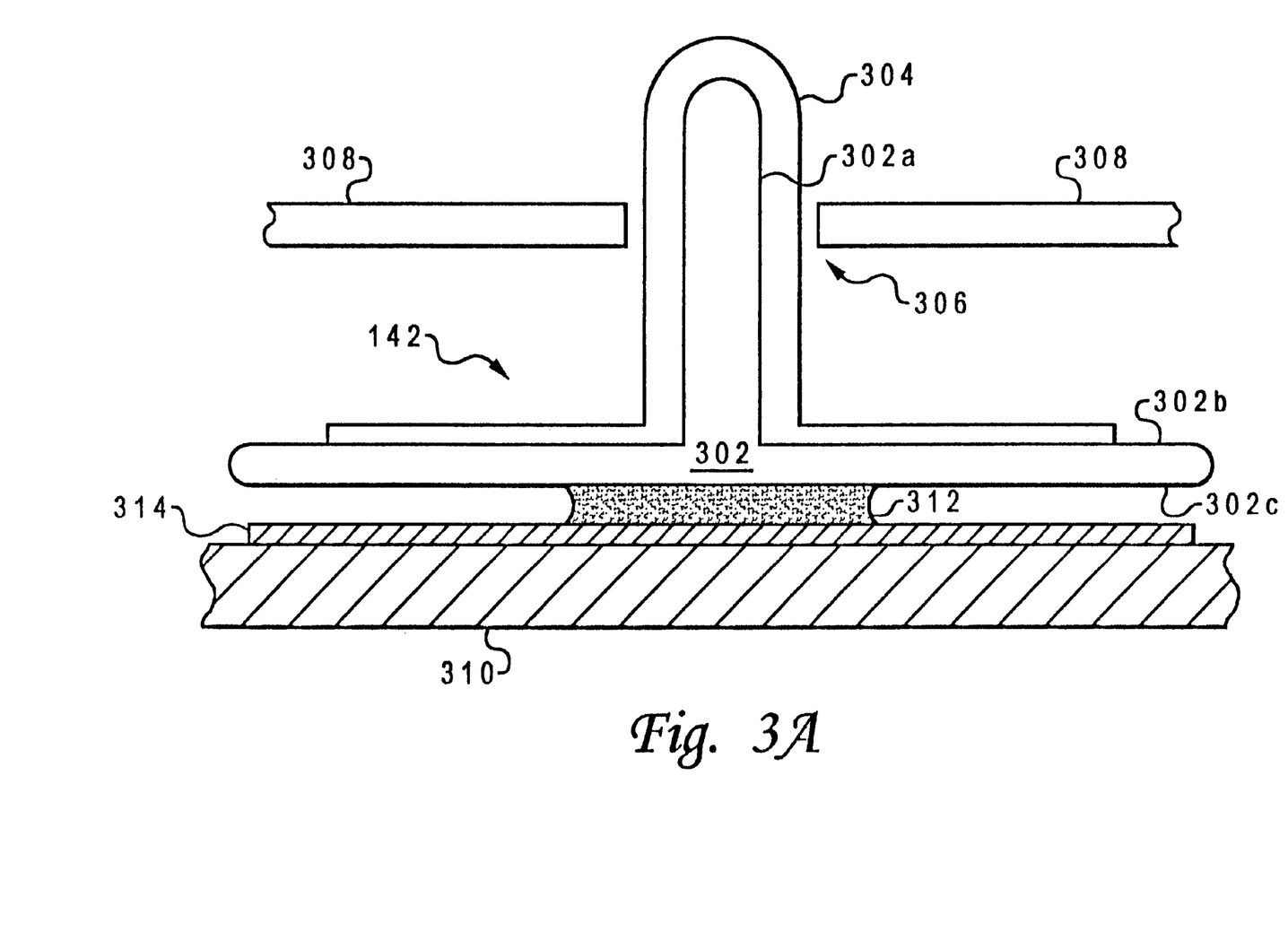
FIGS. 3A–3B depict cross-sectional and elevational views of a capacitive trackpoint-type pointing device in accordance with a preferred embodiment of the present invention.
Figure 3B:
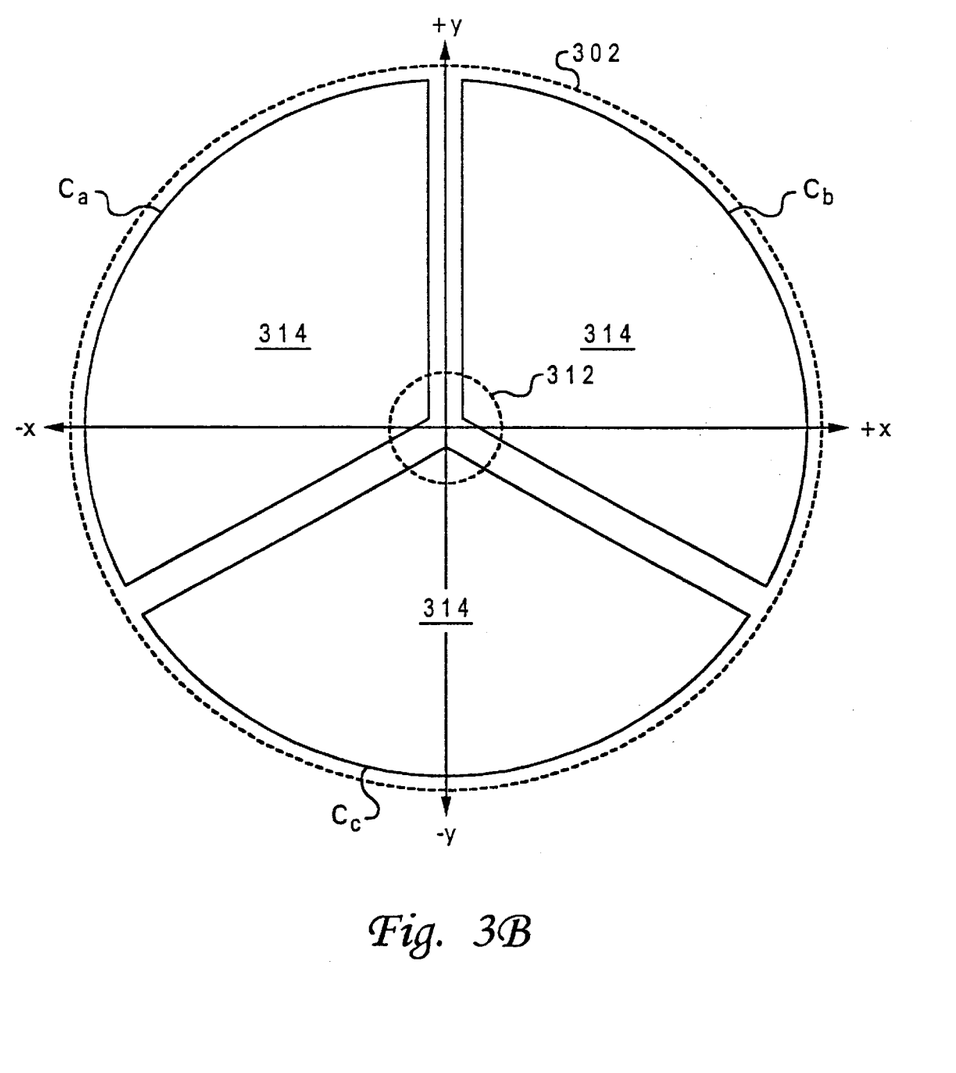

With reference now to FIGS. 3A and 3B, a capacitive trackpoint-type pointing device in accordance with a preferred embodiment of the present invention is depicted. The details of construction of pointing device 142 within remote 106 depicted in FIG. 1D is shown. FIG. 3A is a cross-section of pointing device 142, which includes a moveable stud 302 including a disk 302b having an axially-centered 3post or shaft 302a protruding from the center. Stud 302 provides a user-manipulable pointing stick device, having the look and feel similar to that of a conventional Trackpoint-type device.

Disk 302b, about ¾ inch in diameter, is preferably conductive and/or metal, but at least has a conductive lower surface 302c, such as by employing a conductive layer on a non-conductive material to form conductive lower surface 302c. Lower surface 302c is preferably flat, although other shapes may also be used. For example, disk 302b could be a spherical dish having a 1 to 1.5 inch radius of curvature with the edge approximately ¹⁄₁₆ inch higher than the center when oriented convex side down on a planar surface. Alternatively, disk 302b may have a conical lower surface 302c.

A cap 304, preferably having texturing to catch the skin of the finger and provide a "grippy" high friction top for fingertip manipulation by a user, fits over shaft 302a. Cap 304 may be a friction fit on shaft 302a, or may be attached to shaft 302a with an adhesive. Cap 304 is, in one embodiment, adapted to receive a shaft 302a which is 0.4 inches long and is constructed of plastic, such as nylon. Cap 304 protrudes through an opening 306 in case 308 so that it may be manipulated by the user. In an alternative embodiment of the invention, cap 304 and shaft 302a may be replaced with a flat disk which is manipulated by a user by pressing down between the center and the periphery of the disk.

Moveable stud 302 is attached and mechanically coupled to substrate 310 by means of an adhesive, elastomeric material suitable for electronic applications such as silicone glue 312. Stud 302 is preferably attached to substrate 310 using a controlled or measured amount of the elastomeric adhesive (e.g., about ¹⁄₅₀ of a cubic centimeter). Silicone adhesive RTV162 available from the General Electric Company is suitable, as are heat curable silicone adhesives RTV6424, RTV6445,and TSE322, also available from the General Electric Company, and may be utilized in combination with a suitable silicone primer such as SS4155, also available from the General Electric Company. Other elastomeric adhesives known in the art would also be suitable, but silicone has particularly good properties.

The cured adhesive material is on the order of ⅛ to ⅜ inches in diameter with a thickness of up to approximately 32 mils, holding the lower surface 302c of stud 302 above the sensing electrodes 314 on the upper surface of substrate 310. Substrate 310 underneath stud 302 is a circuit board bearing a plurality of sensing electrodes 314, with adhesive 312 situated at a central region of sensing electrodes 314. Sensing electrodes 314 are preferably etched copper clad and electrically isolated from stud 302 by a thin insulating layer, such as a solder mask or nonconductive tape (not shown) acting as stops or "lands" for movement of lower surface 302c toward sensing electrodes 314. Three equally sized sensing electrodes 314 are preferably arranged in a circular configuration having a total diameter (measured from the outer peripheries) approximately equal to that of disk 302b.

Other suitable methods for maintaining stud 302 in appropriate relation to substrate 310 may be utilized, such as by flexible members as used in prior art trackpoint-type devices. However, silicone adhesive 312 shows little hysteresis and keeps the center of disk 302b at an essentially constant distance from sensors 314 on circuit board substrate 310, while permitting the required amount of cantilever action for operation of the trackpoint-type device. Stud 302 is installed in the neutral position, from which it is moveable by user manipulation. When force is applied to cap 304, a portion of lower surface 302c is brought closer to one or more of sensing electrodes 314. When the user applies force to cap 304, silicone adhesive 312 pushes and pulls stud 302 back to the neutral position once released.

Lower surface 302c and sensing electrodes 314 form three variable capacitances with values determined by the distances lower surface 302c and the respective sensing electrode (i.e. the gap between stud 302 and sensing electrodes 314). Application of lateral force to cap 304 results in a portion of lower surface 302c being moved closer to sensing electrodes 314 and another portion—the opposite side—being moved further away from sensing electrodes 314. This results in a difference of the capacitance between disk 302b and one or more electrodes 314 from the capacitance between disk 302b and one or more other electrodes 314, a difference which may be measured by oscillator frequency differences with respect to the undeflected, rest position frequencies and translated into displacement signals of the type produced by a conventional mouse.

A spacer (not shown) may be placed around the periphery of disk 302b to prevent lower surface 302c from contacting sensing electrodes 314, shorting the capacitors and/or damaging the sensor. Alternatively, movement of shaft 302a and disk 302b may be controlled by the size of hole 306 in case 308 through which cap 304 protrudes. By limiting the amount of movement of cap 304, and therefore of shaft 302a and disk 302b, contact of lower surface 302c to sensing electrodes 314 may be avoided.

FIG. 3B depicts an elevational view of pointing device 142 in accordance with a preferred embodiment of the present invention. Rather than quadrature detection, the present invention employs three sensing electrodes 314 to form variable capacitances $C_a$, $C_b$, and $C_c$ with stud 302 for detection of manipulation of pointing device 142 by the user. The use of three sensing electrodes 314 rather than four as typically employed in the conventional art increases the size of each sensing electrode 314 by one-third over a device having four sensing electrodes with the same overall diameter. Less power is required to read capacitances $C_a$, $C_b$, and $C_c$ since there are only three rather than four. Additionally, the increased size of capacitances $C_a$, $C_b$, and $C_c$ further reduces the power required for reading by reducing the oscillation frequency. Reading the value of each capacitor requires power which, in a remote control device of the type depicted in FIG. 1D, consumes battery energy even when the device is idle (since pointing device 142 must sense when the user begins manipulation). Battery life is an important factor, particularly for Internet access devices (set-top boxes and the like) where direct pointing is an advantage and is used as the primary means of navigation. It is desirable in such remote control devices to achieve the largest capacitive values attainable for a limited area while providing the ability to move the cursor within the graphical user interface.

The larger capacitive area of the present invention also increases the dynamic range of pointing device 142, as well as the sensitivity, and provides more immunity from noise and hysteresis factors with a smaller dead band (region of nonresponsiveness). Because of the large dynamic range, shorter oscillator sampling periods are required for accurate measurement, reducing the power required for sampling. The input device must sample the capacitances once during every predetermined period (e.g., once per second) to determine if a user is manipulating the trackpoint-type device. Because there are fewer capacitors in the present invention, power is applied for a shorter duration during sampling (25% less), reducing the time and energy involved in sampling for input. The three capacitor pointing device 142 of the present invention is, because of the larger capacitance values for a given area and corresponding increased sensitivity, also easier to tune for better response. Pointing device 142 thus responds better than four-capacitor pointing devices, and operates better to provide better control over the cursor.

Changes in capacitance values for $C_a$, $C_b$, and $C_c$ are preferably measured by incorporating each sensing electrode 314 into a respective RC oscillator. The resultant RC time constant, and therefore the oscillation frequency, is a function of the capacitance of lower conductive surface 302c and the respective sensing electrode 314 for capacitance $C_a$, $C_b$, and $C_c$, which is in turn a function of the distance between lower conductive surface 302c and the respective sensing electrode(s) 314.

Figure 4:
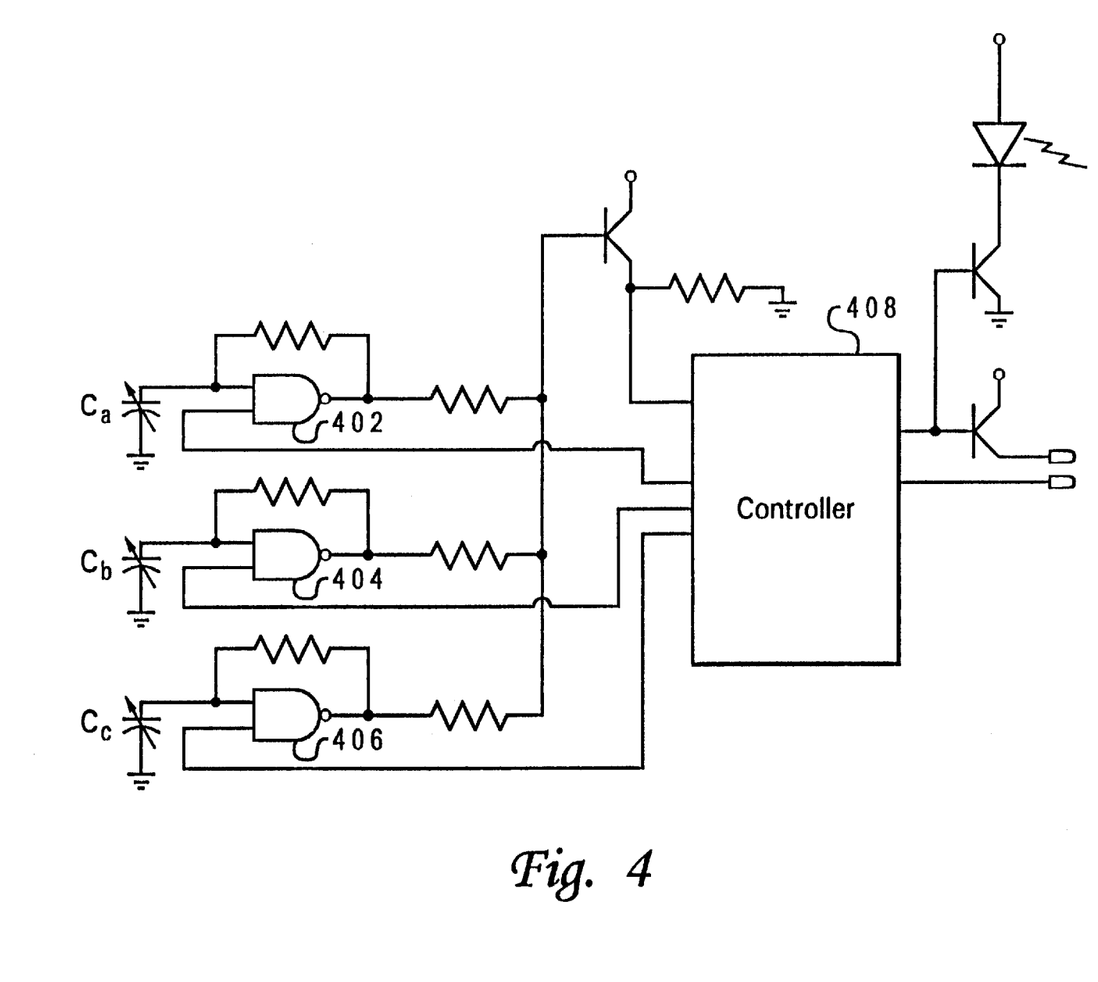
FIG. 4 is a circuit diagram for a circuit for measuring the capacitive values of the sensing electrodes and translating the measurements into conventional x-y displacement values in accordance with a preferred embodiment of the present invention.

Referring to FIG. 4, a circuit diagram for a circuit for measuring the capacitive values of the sensing electrodes and translating the measurements into conventional x-y displacement values in accordance with a preferred embodiment of the present invention is illustrated. The three sensing electrodes 314 depicted in FIGS. 3A and 3B are represented by variable capacitances $C_a$, $C_b$, and $C_c$.

One terminal of each of sensors $C_a$, $C_b$, and $C_c$ is preferably logically grounded (driven to ground by the two non-oscillating NANd gates) while the other terminals are connected to oscillators 402, 404, and 406 comprising NAND gates with resistive feedback. Stud 302 need not be grounded since it forms a capacitance with sensors $C_a$, $C_b$, and $C_c$ and sensors which do not form the capacitance currently being measured are grounded or at a fixed potential. The sensors not being measured at a specific moment in time thus provide sufficient ground-like bypassing to measure the non-grounded sensor with respect to ground. Disk 302b could be grounded by, for example, a conductive adhesive or a flexible wire.

One input to the NAND gates within oscillators 402, 404, and 406 serves as an oscillator input, connected to sensing electrode $C_a$, $C_b$, and $C_c$, while the other serves as a selection control line, connected to a control output on microcontroller 408. When the selection control input to the NAND gate within an oscillator is asserted, the selected oscillator 402, 404, and 406 will oscillate. Preferably only one of oscillators 402, 404, and 406 should be selected (or oscillating) at a time, selecting each oscillator 402, 404, and 406 (and, accordingly, each corresponding sensor $C_a$, $C_b$, and $C_c$) for a brief period in round-robin fashion. This prevents two or more oscillators 402, 404, and 406 from locking into a common frequency impairing the accuracy of the trackpoint-type device.

The outputs of oscillators 402, 404, and 406 are coupled to a sensing input of microcontroller 408, which counts oscillations for a fixed window of time (for example, 1 or 2 ms) and computes the oscillation frequency for each selected oscillator 402, 404, and 406 during the period the respective oscillator is selected. The oscillation frequency measured by counting oscillations over a fixed window of time is related to the capacitance of the selected sensing electrode $C_a$, $C_b$, and $C_c$. Microcontroller 408 then applies calibration routines to the measured signals to produce a normalized force signal compensated for component, mechanical, and manufacturing tolerances. The amount of force applied to the trackpoint-type device is translated to speed, with more force resulting in faster movement of the cursor on the display.

Microcontroller 408 translates the three normalized force signals for one round-robin pass through oscillators 402, 404, and 406 and sensing electrodes $C_a$, $C_b$, and $C_c$ into two axis components utilizing simple trigonometric equations. Preferably, at least one sensing electrode is aligned with a direction of conventional quadrature detection displacement in order to simplify computation. For the embodiment depicted in FIG. 3B, sensing electrode $C_c$ is aligned with the −y direction. Accordingly, the normalized force signals may be translated by microcontroller 408 into conventional quadrature detection signals by:

$$C_x = (C_b - C_a)/3^{1/2}; \text{ and}$$

$$C_y = (C_a + C_b - C_c)/2,$$

where $C_x$ corresponds to force/speed of the cursor on the x axis and $C_y$ corresponds to force/speed on the y axis. If only two capacitances are measured and the third capacitor is employed as a ground land or the location of the adhesive, the second equation becomes:

$$C_y = (C_a + C_b).$$

With different orientations of the sensing electrodes, the applicable trigonometric equations for conversion would change.

Since the trackpoint device is intended to emulate a conventional mouse, which has displacement as an output, microcontroller 408 performs a transformation on the translated, normalized force signals in accordance with the known art to derive displacement-type (displacement or displacement rate/duration). For example, the rate of (mouse) cursor displacement may be computed as a function of the force supplied to the trackpoint-type device shaft in a particular direction, with the sensitivity of the trackpoint-type device adjusted by calibration or zeroing factors. Thus, the capacitive values may be translated to standard mouse displacements by multiplying the duration of a corresponding force on the trackpoint type device by the computed displacement value from its rest position as per the equations for $C_x$ and $C_y$ to derive displacement signals. When the unit is first turned on or when no change of capacitive curves are detected for 3 seconds, a new zero point rest value is calculated and saved by microcontroller 408. After 30 seconds of inactivity, continuous sampling of the capacitive values stops and periodic sampling is resumed for power saving. With the configuration of the present invention, periodic sampling to detect activity by a user could be accomplished by measuring only two capacitances (any two), conserving even more energy in the power saving mode. Microcontroller 408 formats the signal value into a conventional mouse protocol and sends out the signal through an output, such as a serial port (RS-232 or PS/2®) or an infrared port.

The present invention provides larger full-scale signals than resistive trackpoint-type devices or four capacitor devices by maximizing the area for each capacitive sensor by utilizing only three sensors. This improves the sensitivity of the device while reducing the power consumed, an important consideration for trackpoint devices employed in battery-powered infrared remote control devices, infrared keyboards, or the like.

It is important to note that while the present invention has been described in the context of a fully functional device, those skilled in the art will appreciate that the mechanism of the present invention and/or aspects thereof are capable of being distributed in the form of a computer readable medium of instructions in a variety of forms, and that the present invention applies equally regardless of the particular type of signal bearing media used to actually carry out the distribution. Examples of computer readable media include: nonvolatile, hard-coded type media such as read only memories (ROMS) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of operating an input device for a data processing system, comprising:

measuring an oscillation frequency for at least two of three variable capacitances within the input device;

translating the oscillation frequency for the at least two variable capacitances into predetermined signals corresponding to displacement in any of at least two independent directions by:

calculating normalized gain signals for three oscillators each including one of the variable capacitances;

calculating a first signal corresponding to displacement along a first axis from a normalized gain signal for an oscillator including a first of the three variable capacitances minus a normalized gain signal for an oscillator including a second of the three variable capacitances; and calculating a second signal corresponding to displacement along a second axis from a normalized gain signal for an oscillator including the first of the three variable capacitances plus a normalized gain signal for an oscillator including the second of the three variable capacitances minus a normalized gain signal for an oscillator including a third of the variable capacitances; and transforming the predetermined signals into displacement signals for a cursor within a graphical user interface in the data processing system.

2. The method of claim 1, wherein the step of measuring an oscillation frequency for at least two of three variable capacitances within the input device further comprises:

selecting one of the at least two variable capacitances for a period;

counting oscillations of an oscillator including the selected variable capacitance during the period; and repeating the selecting and counting steps for each of the remaining variable capacitances.

3. The method of claim 1, wherein the step of translating the oscillation frequency for the at least two variable capacitances into predetermined signals corresponding to displacement in any of at least two independent directions further comprises:

calculating normalized gain signals for at least two oscillators each including one of the variable capacitances; and calculating signals corresponding to displacement in the at least two independent directions.

4. The method of claim 1, wherein the step of translating the oscillation frequency for the at least two variable capacitances into predetermined signals corresponding to displacement in any of at least two independent directions further comprises:

calculating normalized gain signals for three oscillators each including one of the variable capacitances; and calculating two signals corresponding to displacement along two independent axes.

5. The method of claim 1, wherein the step of translating the oscillation frequency for the at least two variable capacitances into predetermined signals corresponding to displacement in any of at least two independent directions further comprises:

computing zeroing and scaling parameters.

6. A method of operating an input device for a data processing system, comprising:

measuring an oscillation frequency for at least two of three variable capacitances within the input device;

translating the oscillation frequency for the at least two variable capacitances into predetermined signals corresponding to displacement in any of at least two independent directions by:

calculating normalized gain signals for three oscillators each including one of the variable capacitances;

calculating a first signal corresponding to displacement along a first axis from a normalized gain signal for an oscillator including a first of the three variable capacitances minus a normalized gain signal for an oscillator including a second of the three variable capacitances; and calculating a second signal corresponding to displacement along a second axis from a normalized gain signal for an oscillator including the first of the three variable capacitances plus a normalized gain signal for an oscillator including the second of the three variable capacitances; and transforming the predetermined signals into displacement signals for a cursor within a graphical user interface in the data processing system.

7. A computer program product in a computer readable medium, comprising:

instructions for measuring an oscillation frequency for each of three variable capacitances within an input device;

instructions for translating the oscillation frequency for each of three variable capacitances into predetermined signals corresponding to displacement in any of at least two independent directions by:

calculating normalized gain signals for three oscillators each including one of the variable capacitances;

calculating a first signal corresponding to displacement along a first axis from a normalized gain signal for an oscillator including a first of the three variables capacitances minus a normalized gain signal for an oscillator including a second of the three variable capacitances; and calculating a second signal corresponding to displacement along a second axis from a normalized gain signal for an oscillator including the first of the three variable capacitances plus a normalized gain signal for an oscillator including the second of the three variable capacitances minus a normalized gain signal for an oscillator including a third of the variable capacitances; and instructions for transforming the predetermined signals into displacement signals for a cursor within a graphical user interface in the data processing system.

8. The computer program product of claim 7, wherein the instructions comprise a input device driver for the input device.

9. The computer program product of claim 7, wherein the instructions are contained in a microcontroller within the input device for a data processing system.

10. The computer program product of claim 7, wherein the instructions form a portion of an operating system for a data processing system.

11. A computer program product in a computer readable medium, comprising:

instructions for measuring an oscillation frequency for at least two of three variable capacitances within the input device;

instructions for translating the oscillation frequency for the at least two variable capacitances into predetermined signals corresponding to displacement in any of at least two independent directions by:

calculating normalized gain signals for three oscillators each including one of the variable capacitances;

calculating a first signal corresponding to displacement along a first axis from a normalized gain signal for an oscillator including a first of the three variables capacitances minus a normalized gain signal for an oscillator including a second of the three variable capacitances; and calculating a second signal corresponding to displacement along a second axis from a normalized gain for an oscillator including the first of the three variables capacitances plus a normalized gain signal for an oscillator including the second of the three variable capacitances; and instructions for transforming the predetermined signals into displacement signals for a cursor within a graphical user interface in the processing system.

* * * * *

UNITED STATES PATENT AND TRADEMARK OFFICE
CERTIFICATE OF CORRECTION

PATENT NO. : 6,271,830 B1
DATED : August 7, 2001
INVENTOR(S) : Berstis

It is certified that error appears in the above-identified patent and that said Letters Patent is hereby corrected as shown below:

<u>Column 10,</u>
Line 1, please delete "PS/20)" and add -- PS/2) --.

Signed and Sealed this

Twenty-first Day of May, 2002

Attest:

Attesting Officer

JAMES E. ROGAN
Director of the United States Patent and Trademark Office